（12）United States Patent
Federighi

(10) Patent No.: US 9,289,098 B2
(45) Date of Patent: Mar. 22, 2016

(54) AUTO-ROTATING MUDDLER

(71) Applicant: William D. Federighi, Novato, CA (US)

(72) Inventor: William D. Federighi, Novato, CA (US)

( * ) Notice: Subject to any disclaimer, the term of this patent is extended or adjusted under 35 U.S.C. 154(b) by 450 days.

(21) Appl. No.: 13/952,897

(22) Filed: Jul. 29, 2013

(65) Prior Publication Data

US 2015/0028141 A1 Jan. 29, 2015

(51) Int. Cl.
*A47J 43/044* (2006.01)

(52) U.S. Cl.
CPC ...... *A47J 43/044* (2013.01); *A47J 2043/04427* (2013.01)

(58) Field of Classification Search
CPC .......................... A47J 43/044; A47J 43/04427
USPC ............................................. 241/169.1, 169.2
See application file for complete search history.

(56) References Cited

U.S. PATENT DOCUMENTS

| 3,552,017 | A | * | 1/1971 | Smuts | A47G 21/026 30/322 |
| 5,005,293 | A | * | 4/1991 | Di Amico | A47G 21/026 301/148 |
| 6,056,206 | A | * | 5/2000 | Whiton | A47G 21/181 215/388 |
| 6,793,168 | B1 | * | 9/2004 | Pedersen | A47J 42/04 241/169.1 |
| 2011/0042497 | A1 | * | 2/2011 | Silvers | A47G 21/023 241/101.8 |
| 2014/0065276 | A1 | * | 3/2014 | Howard | A47J 19/04 426/489 |
| 2014/0099423 | A1 | * | 4/2014 | Furrow | A47G 19/2222 426/590 |

\* cited by examiner

*Primary Examiner* — Mark Rosenbaum
(74) *Attorney, Agent, or Firm* — Howard Cohen

(57) ABSTRACT

A muddler includes a handle and a shaft extending axially from the handle. The handle has a bore with helical grooves in the interior surface thereof. The shaft has a proximal end received in the bore, and a pin extends through the shaft to engage the helical grooves. A compression spring in the bore urges the shaft distally. A pestle head is secured to the distal end of the shaft, with a convex distal end surface having a plurality of projections extending distally to contact the solid materials to be crushed and bruized or broken. A force transmitted distally from the handle causes the spring to compress, driving the proximal end of the shaft into the bore and causing the shaft to rotate, further bruising and crushing the solid ingredients and creating a mixing action among the solid ingredients.

10 Claims, 3 Drawing Sheets

AUTO-ROTATING MUDDLER

CROSS-REFERENCE TO RELATED APPLICATIONS

Not applicable.

FEDERALLY SPONSORED RESEARCH

Not applicable.

SEQUENCE LISTING, ETC ON CD

Not applicable.

BACKGROUND OF THE INVENTION

1. Field of the Invention

This invention relates to a muddler used in preparing mixed drinks and, more particularly, to a muddler with an auto-rotating pestle end.

2. Description of Related Art

In the mythology of mixology the muddler is a primary tool that is used to combine and crush solid ingredients of a drink. In a manner similar to a mortar and pestle, the muddler is a pestle that has a blunt or flattened end that is shaped to crush ingredients, e.g., held in the bottom of a glass or similar vessel which serves as the mortar, often before the liquid ingredients are added to the glass. Muddlers are traditionally fabricated of hardwood, and may be turned or carved to include a convenient handle shape adjacent to the pestle end. In more recent times muddlers have been fabricated of an impervious, food-grade hard plastic which is more durable when properly cleaned in a bar dishwasher that employs high temperature water and strong detergents. The food-grade hard plastic muddler is often chosen for use in mixing contemporary drinks that include fruit and fruit juices.

Contemporary drinks that are commonly prepared using a muddler include mint julep, mojito, caipirnha, old fashioned, and the like. New drinks employing other herbal ingredients and unusual fruit combinations are introduced regularly.

Aside from the general use of crushing an object such as a sugar cube, the muddler often serves to bruise and break leaves of herbs such as mint in order to cause them to release their essential aromatic oils, thereby to increase their flavoring effect in the drink being prepared. In this regard the pestle end of the muddler is not the optimal tool, since it is adapted primarily for crushing but not rending or shredding. Indeed, rending and shredding are typically accomplished by relative lateral motion between the pestle head and the surface of the glass vessel or container. The broad head of a muddler is normally almost as wide as the bottom of a drinking glass, providing very little free space for movement of the muddler head in the glass. Therefore crushing and pounding movements are often used instead. Muddlers as known in the prior art thus require more time and effort to bruise and rend the herbal ingredients in particular.

BRIEF SUMMARY OF THE INVENTION

The present invention generally comprises an improved muddler designed for use in preparing muddled drinks with less effort and in less time than required with similar tools known in the prior art.

The muddler of the invention is comprised of an elongated handle that is shaped to be wielded comfortably in one hand, and a shaft extending axially from the handle. The handle is provided with an axially extending bore, and one or more helical grooves are formed in the interior surface of the bore. The shaft includes a proximal end that is dimensioned to be received in rotatable fashion in the bore of the handle, and a pin extends through the proximal end of the shaft so that its opposed ends engage the helical grooves in the bore. A compression spring is located in the proximal end of the bore and disposed to urge the shaft distally in the bore. A cap secured to the distal end of the handle includes a central opening through which the shaft extends distally from the handle, the cap securing the proximal end of the shaft and the spring in the bore of the handle.

At the distal end of the shaft a pestle head is secured. The pestle head may comprise a disk-like element having a shallowly convex distal end surface that is designed to engage the solid material to be crushed and bruised or broken. The distal end surface of the pestle head may be provided with a plurality of projections extending distally in a shallow manner to contact the materials to be muddled. In one embodiment the projections comprise a plurality of lugs distributed in an array about the distal end surface. In another embodiment the projections comprise a plurality of ridges extending radially from the center of the distal end surface.

It may be appreciated that the muddler assembly is grasped at the handle end and the distal end placed in a glass vessel or the like with the solid ingredients in the bottom of the vessel. The user pushes down on the handle end, urging the pestle head to impinge on the solid ingredients and crush them. At the same time the force transmitted distally from the handle through the spring to the shaft causes the spring to compress, driving the proximal end of the shaft into the bore and causing the opposed ends of the pin to translate along the helical grooves in the bore. The result of this engagement is that the shaft is driven to rotate, causing the pestle head to rotate against the solid ingredients in the bottom of the glass vessel, bruising and rending the herbal ingredients in particular and also creating a mixing action among the solid ingredients and the liquid in the bottom of the glass vessel.

When the handle has compressed the spring to its limit, the user releases the downward force and the handle is urged to translate axially and proximally. The opposed ends of the pin once again translate along the helical grooves in the bore, reversing the rotational motion of the shaft and adding to the mixing and muddling effect of the tool. That is, the shaft and pestle head are driven in both rotational directions to create a muddling effect on both the proximal and distal movements of the handle. In this way the muddler achieves the task of crushing the solid ingredients and bruising and rending the herbal ingredients much faster than the typical fixed-head muddling tool.

DESCRIPTION OF THE PREFERRED EMBODIMENT

The present invention generally comprises an improved muddling tool designed for use in preparing muddled drinks and macerated and mixed comestibles with less effort and in less time than required with similar tools known in the prior art. In particular the muddling tool provides an auto-rotating pestle head that increases the muddling effect of the tool while reducing the manual effort required.

Figure 1:
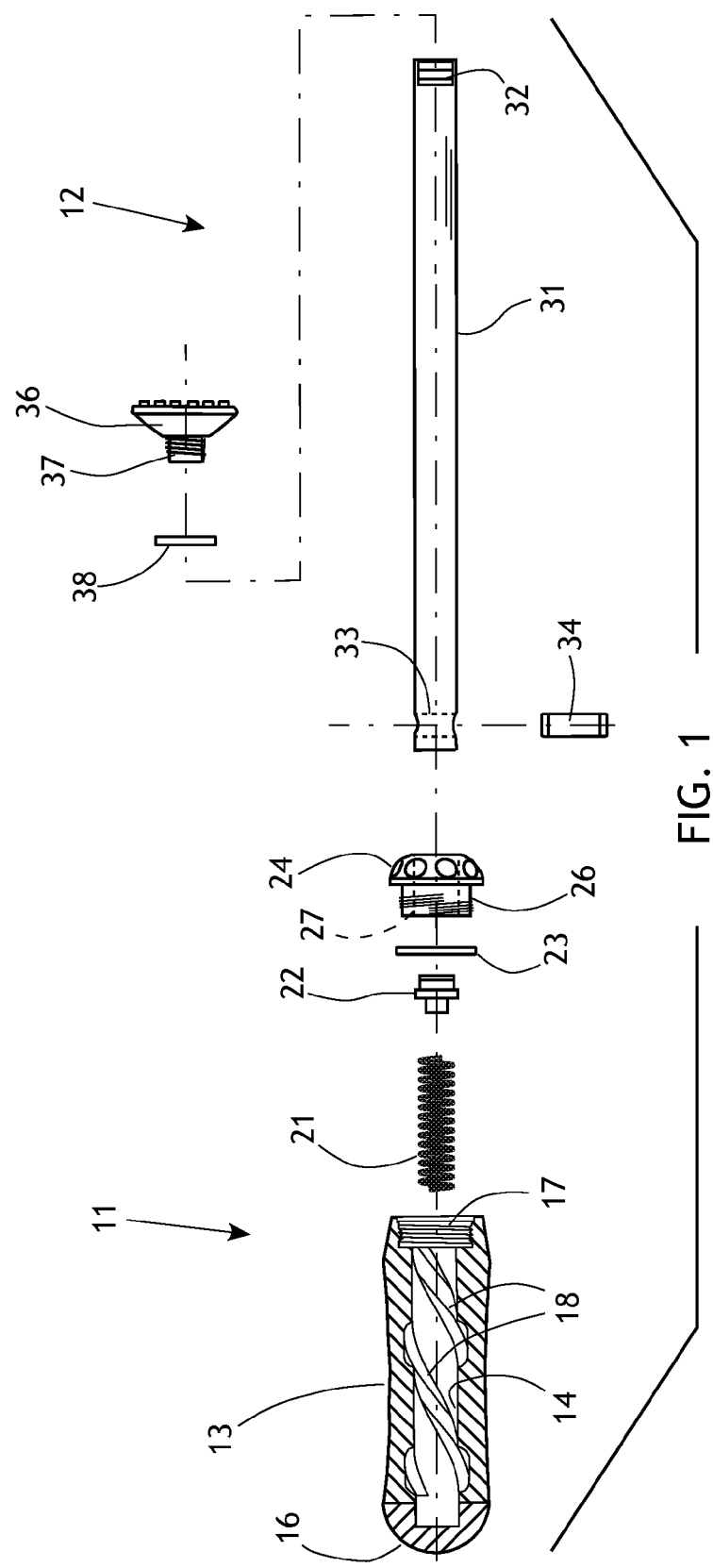
FIG. 1 is an exploded view of the assembly of the auto-rotating muddler of the present invention.
Figure 2:
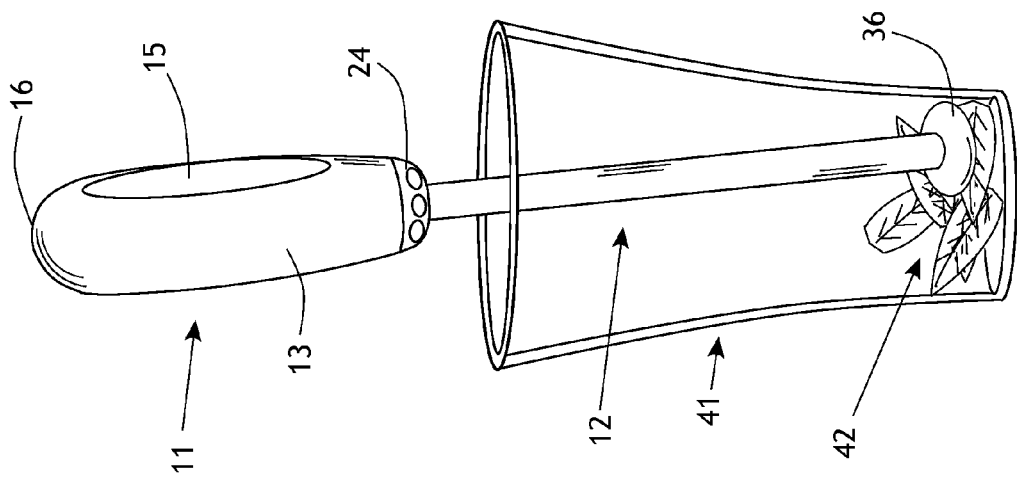
FIG. 2 is a side elevation of the muddler of the invention in a typical usage preparing a drink in a glass vessel.

With regard to FIGS. 1 and 2, the muddling tool of the invention includes a handle assembly 11 and a shaft assembly 12 extending therefrom. The handle assembly 11 is comprised of a tubular handle 13 having a bore 14 extending axially therethrough. The exterior surface of the handle may be provided with a pair of flat surfaces 15 (FIG. 2) disposed in parallel, diametrical opposition in order to facilitate grasping and comfortable manipulation of the handle 13. The proximal end of the handle is smoothly radiused to form a rounded, oblate end that may be pushed with the palm of the hand, as described below. At the distal end the bore 14 a wider diameter receptacle is provided with internal female threads 17 that are slightly tapered inwardly. A key feature is the provision of a pair of helical grooves 18 formed in the interior surface of the bore 14 and disposed in diametrically opposed relationship each to the other.

A helical compression spring 21 is dimensioned to be received within the proximal end portion of bore 14 in freely moving fashion, and a spring keeper 22 has a proximal end that is secured in the distal end of the spring 21. A handle cap 24 has a reduced diameter proximal end 26 that is externally threaded in a manner that is complementary to threads 17 of the handle 13. A bushing 23 is received about the end 26 to properly seat the cap 24 against the distal end of the handle 13. Note that the cap 24 includes bore 27 extending axially therethrough.

The shaft assembly 12 is comprised of a tubular shaft 31 having a threaded receptacle 32 formed in the distal end thereof and extending coaxially with the axis of the shaft 31. The shaft 31 may be a solid component or a hollow tube, depending on the material and the strength requirements. At the proximal end of the shaft a transverse hole 33 is formed, and a transverse pin 34 is secured in the hole 33 with opposed ends that protrude slightly from the shaft 31. The diameter of shaft 31 is slightly less than the diameter of bore 14, so that the shaft may extend through the bore 27 of cap 24 and into the bore 14 of the handle. The ends of pin 34 extend sufficiently to be received in the helical grooves 18 in freely sliding fashion. The spring keeper 22 includes a distal end surface that is approximately the same diameter as the proximal end of shaft 31, so that axial movement of the shaft compresses and expands the spring 21 in the axial direction, while engagement of the pin 34 in the helical grooves 18 causes the shaft to rotate reversibly and as the shaft translates in bore 14.

Figure 4A:
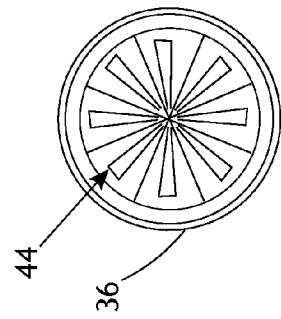
FIGS. 4A and 4B are end and perspective side views, respectively, of another pestle head embodiment of the invention.
Figure 4B:
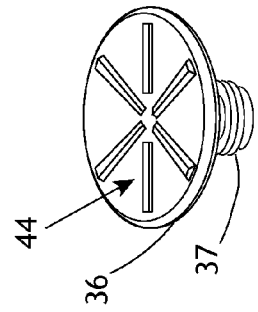
Figure 3A:
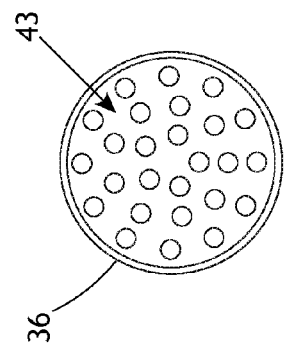
FIGS. 3A and 3B are end and perspective side views, respectively, of a pestle head embodiment of the invention.
Figure 3B:
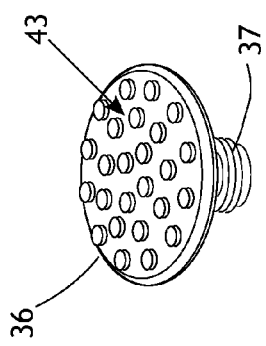

The shaft assembly 12 further includes a pestle head 36, comprising a disk-like component having a shallowly convex distal end surface adapted to engage solid material such as herbs and additives for drink constituents. The proximal end 37 of the pestle head is a cylindrical projection having external threads that are complementary to the threaded receptable 32, whereby the head 36 maybe secured at the distal end of shaft 31. A bushing 38 is secured about end 37 to properly seat the head with respect to the shaft. The convex distal end surface of the pestle head may be provided with a plurality of projections extending distally in a shallow manner to contact the materials to be muddled. As shown in FIGS. 3A and 3B, the projections may comprise a plurality of lugs 43 distributed in an array about the distal end surface and projecting outwardly therefrom. As shown in FIGS. 4A and 4B, the projections may comprise a plurality of ridges 44 extending radially from the center of the distal end surface. Other surface treatments may be provided to achieve the desired result: the breaking and crushing of drink constituents in the bottom of a glass or container.

The muddler is designed to accommodate different pestle heads 36 to adapt the muddler for differing bar and kitchen tasks. It is designed to perform the same culinary functions as a mortar and pestle by the selection and use of the interchangeable heads. For example, a flat pestle head 36, for a traditional bar muddler, may be used to press and extract oils from aromatics and fruit such as mint. This flat head may also be used to remove oil from cooking herbs and toasted cooking spices. On the other hand a ridged head 36 may be used to crush and blend spices into pastes and rubs, or to mash vegetables such as avocado.

A cross cut or toothed pestle head 36 may be used to macerate fruit and blend with sugars for cocktails and sauces, whereas a chopping head may be used to chop small fruits and vegetables such as garlic. And a combination head, such as a mixed toothed and flat head, may be used to crush and blend spices and grains such as flax. The pestle heads depicted in FIGS. 3 and 4 are mere examples of the variety of pestle heads that may be provided and interchanged.

Figure 5A:
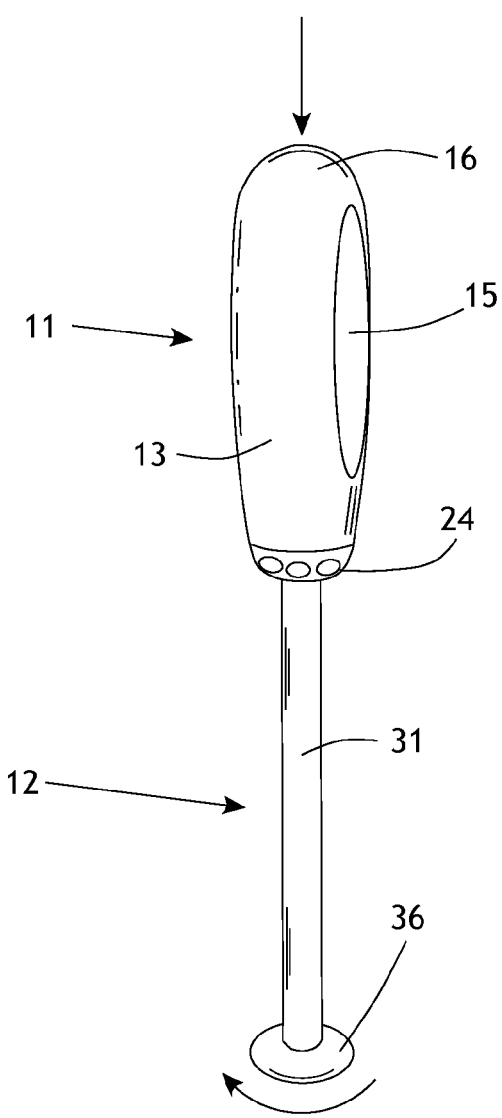
FIGS. 5A and 5B are upright perspective views showing the operation of the muddler in compression (FIG. 5A) and expansion (FIG. 5B).

With regard to FIG. 2, the muddler assembly is grasped by the handle 13 and the distal end with the pestle head 36 is placed in a glass vessel 41 or the like with the solid ingredients 42 in the bottom of the vessel. The user pushes down on the handle end, urging the pestle head to impinge on the solid ingredients (herbs, sugar cubes, citrus zest, fruit, etc.) and rend or crush them. At the same time the force is transmitted distally from the handle 13 axially through the spring 21 to the shaft 31, causing the spring to compress. This action drives the proximal end of the shaft 31 into the bore 14 and causes the opposed ends of the pin 34 to translate along the helical grooves 18 in the bore. The result of this engagement is that the shaft 31 is driven to rotate (FIG. 5A), causing the pestle head 36 to rotate against the solid ingredients 42 in the bottom of the glass vessel 41, bruising and rending the herbal ingredients in particular and also creating a mixing action among the solid ingredients and the liquid in the bottom of the glass vessel. The axial force in addition to the rotation applied to the pestle head is far more effective than a typical muddler tool which applies only axial force to the ingredients 42.

Figure 5B:
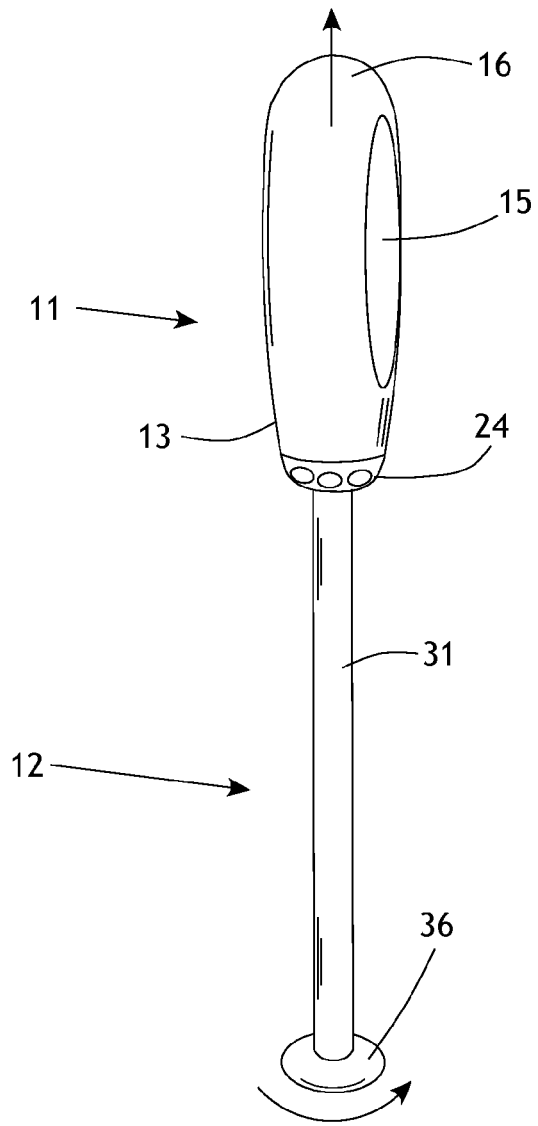

When the handle 13 has compressed the spring 21 to its limit, the user releases the downward force and the handle is urged to translate axially and proximally. The opposed ends of the pin 34 once again translate along the helical grooves 18 in the bore 14, reversing the rotational motion of the shaft 31 (FIG. 5B) and adding to the mixing and muddling effect of the tool. That is, the shaft and pestle head are driven reciprocally in both rotational directions to create a muddling effect on both the proximal and distal movements of the handle. In this way the muddler achieves the task of crushing the solid ingredients and bruising and rending the herbal ingredients much faster than the typical fixed-head muddling tool.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A muddler tool for macerating and mixing comestible foodstuffs, including:
    a shaft extending axially and having a pestle head secured at a distal end of said shaft;
    a handle assembly having a bore adapted for receiving a proximal end of said shaft for rotation and translation therein; and,
    helical means within said bore for rotating said shaft as said proximal end of said shaft translates axially in said bore.

2. The muddler tool of claim 1, wherein said helical means includes at least one helical track extending in said bore.

3. The muddler tool of claim 2, further including at least one pin end extending transversely from said proximal end of said shaft and disposed to be slidably received in said at least one helical track.

4. The muddler tool of claim 3, further including a pair of said helical tracks disposed in diametrical opposition in said bore, and a pair of said pin ends extending from said proximal end of said shaft to engage said pair of helical tracks.

5. The muddler tool of claim 1, further including a compression spring disposed in said bore, said compression spring located between a proximal end of said bore and said proximal end of said shaft, said compression spring biasing said shaft to translate axially distally in said bore.

6. The muddler tool of claim 5, further including a spring keeper having a proximal end received within said compression spring and a distal end impinging on said proximal end of said shaft.

7. The muddler tool of claim 1, further including releasable means for securing said pestle head to a distal end of said shaft.

8. The muddler tool of claim 7, where said releasable means includes a threaded proximal end portion of said pestle head, and a complementarily-threaded receptacle formed in said distal end of said shaft.

9. The muddler tool of claim 7, further including a plurality of interchangeable pestle heads, each having a differing distal end surface for performing correspondingly differing mixing and macerating pestle functions.

10. The muddler tool of claim 1, wherein said handle assembly further includes a cap secured in a distal end of said bore and including an opening through said cap through which said shaft extends.

\* \* \* \* \*